(12) United States Patent
Carro

(10) Patent No.: US 6,721,285 B1
(45) Date of Patent: Apr. 13, 2004

(54) POLLING SYSTEM FOR A DUPLEX ASYMMETRICAL COMMUNICATIONS LINK

(75) Inventor: Fernando Incertis Carro, Valencia (ES)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/532,224

(22) Filed: Mar. 22, 2000

(30) Foreign Application Priority Data

Mar. 30, 1999 (EP) .......................................... 994800134

(51) Int. Cl.[7] ................................................. H04B 7/00
(52) U.S. Cl. ................................................... 370/277
(58) Field of Search ............................... 370/449, 346, 370/277, 242, 458, 464, 465, 447, 450, 457; 455/463, 464, 465, 507, 508, 509; 710/109

(56) References Cited

U.S. PATENT DOCUMENTS

| | | | | |
|---|---|---|---|---|
| 4,230,989 A | * | 10/1980 | Buehrle ........................ | 375/4 |
| 4,251,865 A | * | 2/1981 | Moore et al. ............... | 710/109 |
| 4,942,572 A | | 7/1990 | Picard ........................ | 370/449 |
| 5,014,295 A | * | 5/1991 | Kunihiro .................... | 455/463 |
| 5,539,882 A | | 7/1996 | Gopal et al. ................ | 709/220 |
| 5,577,043 A | * | 11/1996 | Guo et al. ................... | 370/449 |
| 5,706,210 A | * | 1/1998 | Kumano et al. ............ | 709/224 |
| 5,805,586 A | * | 9/1998 | Perreault et al. ............ | 370/346 |
| 5,815,660 A | * | 9/1998 | Momona ..................... | 709/208 |
| 6,229,807 B1 | * | 5/2001 | Bauchot et al. .......... | 370/241.1 |
| 6,275,500 B1 | * | 8/2001 | Callaway, Jr. et al. ...... | 370/449 |
| 6,490,459 B1 | * | 12/2002 | Sugaya et al. .............. | 455/517 |

* cited by examiner

*Primary Examiner*—Chi Pham
*Assistant Examiner*—Alexander O. Boakye
(74) *Attorney, Agent, or Firm*—Schmeiser, Olsen & Watts; John R. Pivnichny

(57) ABSTRACT

In a duplex communications system a master station transmits to and receives from a multiplicity of remote terminals over a shared broadcast communications channel. A polling method and system is disclosed which takes advantage of the asymmetrical reliability of the channel preferably broadcasting from the master station thus, forwarding polling commands carrying a status towards the remote terminals due to deliver responses including only the changes in order to use much more efficiently the channel. Also, the scheme allows to carry out most of the error recovery process in each remote terminal thus completely freeing the in master for its chief task, i.e., the management of the network of remote terminals.

12 Claims, 7 Drawing Sheets

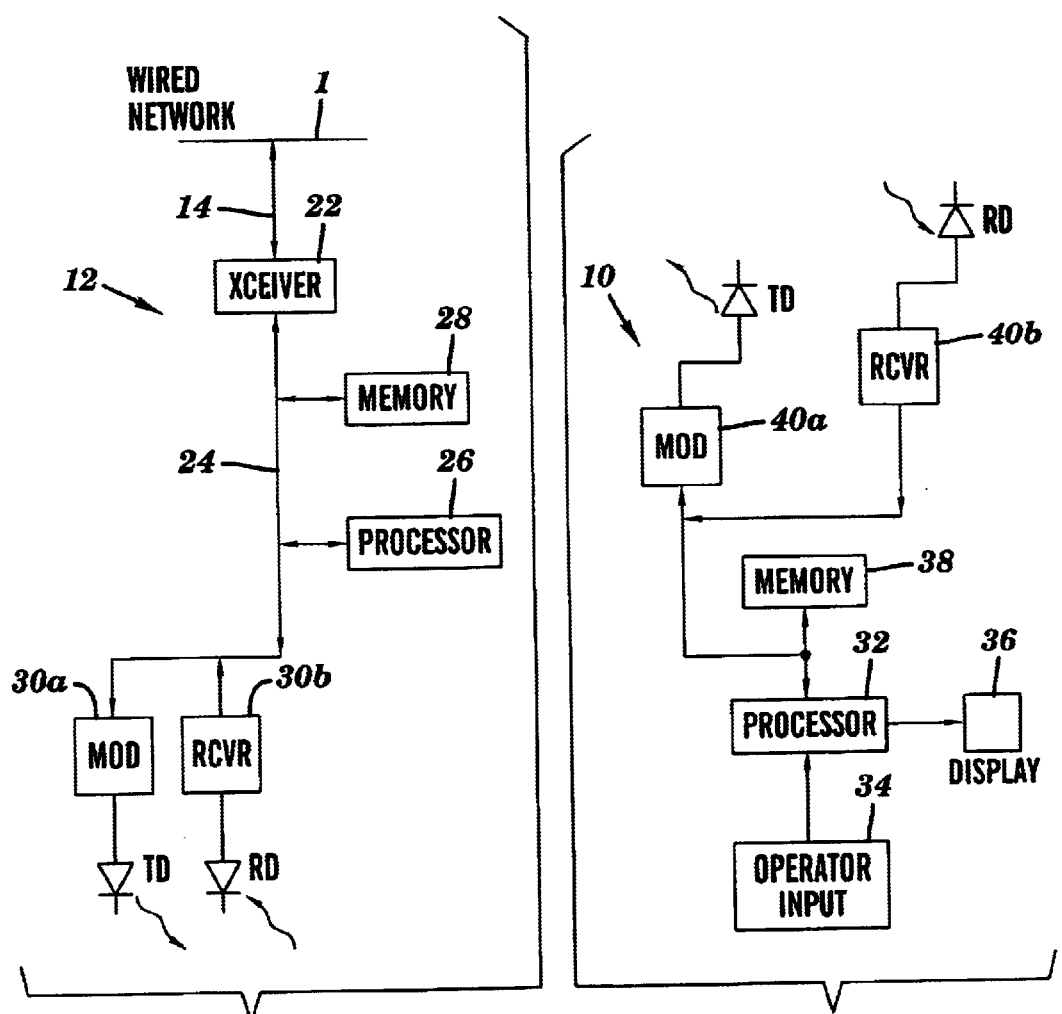
*FIG. 7A*  *FIG. 7B*

POLLING SYSTEM FOR A DUPLEX ASYMMETRICAL COMMUNICATIONS LINK

FIELD OF THE INVENTION

The present invention relates generally to the field of duplex communications, and more particularly to systems wherein a master station transmits to and receives from a plurality of remote stations over a single channel.

BACKGROUND OF THE INVENTION

There are many types of systems wherein one master unit communicates with a number of remote units using a two-way flow of data over a single communication channel. Examples of network systems sharing a common media are LAN (Local Area Networks), satellite communication, cable TV or wireless RF (Radio Frequency) transmission paging or mobile cellular phone systems. In these cases the master station broadcasts outbound signals to all remote stations simultaneously while the communication in the opposite direction i.e., from remote stations to the master, is done through multiple inbound channels time-shared between all remote units. In such systems each remote unit has a unique assigned address or identifier and the master is capable of polling each of them, broadcasting a polling signal containing the address of a target remote unit. Upon receiving the polling signal the addressed remote unit is due to respond even though it has no data to send however, permitting the master to keep track of the fleet of remote stations thus, for example, being updated with a status of the polled remote unit.

As the number of remote stations increases and they are more and more used the time left, to each of them, of the common inbound communication channel, i.e., from slaves to master, may dramatically be impacted up to a point where collisions are unavoidable or no communication at all becomes possible, for some period of time, between the master and some remote stations just because there were not enough inbound channels left. Then, in such systems, it is of the utmost importance that the common communication channel be used as efficiently as possible so as it can be shared between many users.

Also, it must be pointed out that if the single broadcast outbound communication channel, from the master to the slaves, can be adapted in many ways to make sure that all remote stations receive polling signals of a sufficient amplitude and power so as they can be safely interpreted by the receiving part of the remote units, generally mobile or portable units, the opposite is hardly possible. Quality of the broadcasting may be improved, for example, by increasing the power of the master transmission device or by equipping the area that must covered by the communication network with enough regenerators or relays. On the contrary, because they are generally portable units, the outbound power emitted from each remote unit is drastically controlled, for many obvious reasons, such as the necessity of limiting the power consumption from a battery or the level of the RF signal which must stay safe for the human being handling the device.

As a consequence the quality of the communication is intrinsically "asymmetrical". That is, the numerous inbound channels are much prone to errors than the single broadcasting outbound channel which can be improved at both ends by upgrading the characteristics the transmitting source (or multiplying them) and improving the level of reception of the receiver part of the remote units without being constrained by the above limiting factors dealing with the capacity of a battery or the harmless level of RF power which can be emitted from a portable device.

It is therefore one purpose of the present invention to provide a polling method and system for two-way communication between a multiplicity of remote units and a master station over a common media in which the broadcast outbound channel is more reliable than the individual inbound channels.

SUMMARY OF THE INVENTION

The invention discloses in a duplex communications system comprising a master station which controls access by a multiplicity of remote terminals to a broadcasting channel, said channel being for transmitting and receiving signals to and from said controlled remote terminals, a method of polling from said master station all said remote terminals, comprising the steps of:

broadcasting from a master station a polling command destined to a particular remote terminal, the polling command including a unique identifier and a status of the particular remote terminal which is stored in the master station;

receiving in all the remote terminals the polling command which is decoded so that only one of the remote terminals, recognizing its identifier, performs a self selection;

comparing, in the self selecting remote terminal, the status read in the polling command versus the actual current status of the self selecting remote terminal;

if no difference is observed between the current status of the terminal and the status in the polling command, forwarding to the master station, from the self selecting remote terminal, a response to the polling command including a report that no difference is observed between the current status of the terminal and said status of said polling command;

if a difference is observed between the current status of the terminal and the status in the polling command , forwarding to the master station, from the self selecting remote terminal, a response to the polling command including a report of the differences observed between the current status of the terminal and the status of the polling command; and, updating in the master station the stored status of the answering terminal with the status corresponding to the reporting received in the response from the terminal.

The method of the invention takes advantage of an asymmetrical broadcasting communications channel in which the outbound channel, from a master station to a multiplicity of remote terminals, is more reliable than the individual inbound channels. Then, the remote terminals have only to respond with the changes, if any, observed versus the status broadcasted from the master station. This scheme permits limiting the size of the responses thus, the time needed to transmit them and serves two purposes. Firstly, this increases the probability for a response of not being altered over the lesser reliable channel. Secondly, it improves channel efficiency in freeing bandwidth so that more users may share simultaneously a common scarce transmission medium. Moreover, this scheme allows to implement most of the error recovery mechanism in the remote terminals which, being periodically updated from the master station, know exactly what they have to re-send in case of failure. This is achieved without requiring any assistance from the master station whose processing capability remains completely available for managing the network.

BRIEF DESCRIPTION OF THE DRAWINGS

FIG. 7A and FIG. 7B show a preferred embodiment of the master station and mobile units in block diagram form.

DETAILED DESCRIPTION OF THE PREFERRED EMBODIMENT

Figure 1:
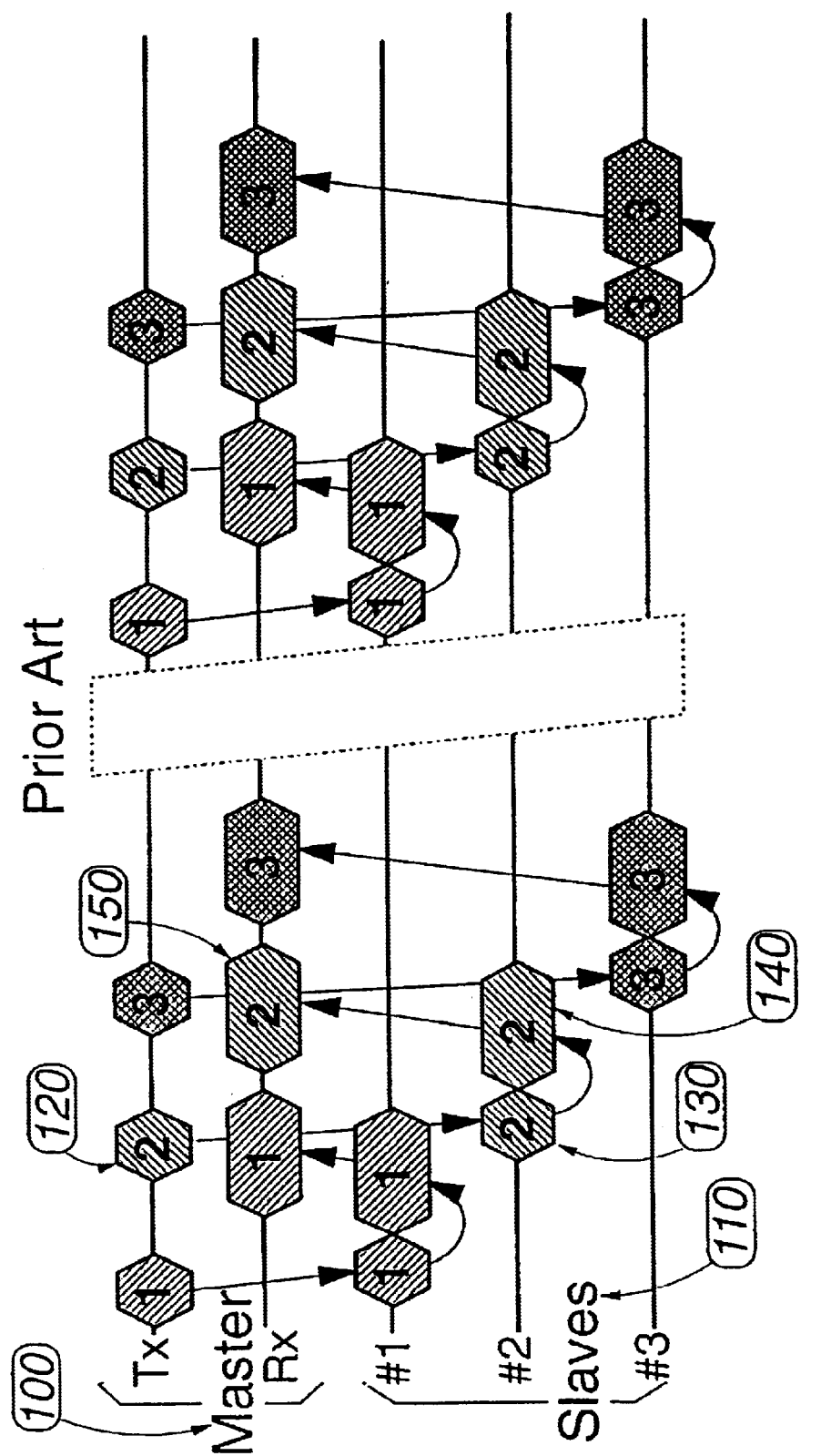
FIG. 1 illustrates the prior art whenever a master unit is polling remote stations by issuing short polling commands, one to each of the polled stations.

FIG. 1 focuses on the prior art conceptually showing the polling of a plurality of remote stations [110] from a master unit [100]. Typically, a short polling command like [120] is broadcast to all remote stations over the common transmission medium, however carrying a unique identifier, e.g., 2 in this particular example. In which case only the remote unit 2, as shown in [130], receiving and recognizing its identifier, generates a response captured, as shown at [150], by the master unit among all the other remote unit responses, result of the current polling sequence. The polling of all the remote stations repeats whenever all have been interrogated and have responded. Although, for the sake of clarity, only two polling sequences of three slaves are shown in FIG. 1, it must understood that many more remote stations are usually involved while polling itself goes on forever. This process is typical of a wireless communication medium and is characterized firstly by a limited spectrum or bandwidth to be shared between many users; secondly by higher error rates; thirdly by a large variation of these conditions over the time or geographic location. The causes range from signal propagation conditions changing drastically over the time, sometimes good and sometimes worse, just because of the weather or for any other reason such as the particular location of a mobile remote station. Also, obviously, in this type of communication which shares a common transmission medium, a major factor is the number of users actually using it at any given instant within the area covered by the master unit and often referred to as a "cell" in the cellular mobile phone system. Thus, using efficiently the available bandwidth is the major concern of those in charge of designing and running this type of network. Moreover, the sometimes poor or very poor transmission and reception conditions have triggered the use of error correction techniques that fall into two main categories which are the ARQ and FEC techniques. The FEC or Forward Error Correction techniques, are characterized in that some redundancy is added at the source by the transmitter so as the receiver is able to recover the original information or at least detect that errors have occurred if the transmitted data have been too much altered. This does not help using efficiently the bandwidth since more information is transmitted than is strictly necessary. The other type of technique, referred to as ARQ for Automatic Repeat Request, relies rather on the retransmission of information whenever data have been corrupted. The obvious advantage in this latter case being that, if the conditions of transmission are excellent or good, no error is occurring, which does not trigger any retransmission at all thus, allowing a full usage of the available bandwidth while FEC technique is always forwarding redundancy bits regardless of the actual transmission conditions. However, the drawback of this second way of handling errors has to deal with the round-trip delay incurred when errors have to be corrected and resulting from the few, back and forth, exchanges required, between master and remote units, for replaying a transaction that has failed along with the associated extra burden placed on the polling station software attempting to manage the failures. This, under adverse conditions, may become critical whenever many communications to/from remote terminals are impacted simultaneously (for example when communications are restarted after a failure of the front-end part of the polling station) and may result in an overloading of the polling station processing capability. In practice, the two techniques are often combined into a so-called hybrid scheme in an attempt to benefit from their inherent advantages. Irrespective of the intrinsic difficulties stemming from the sharing of a common transmission medium, briefly mentioned above, this type of network has become very popular and very successful especially the wireless networks, up to a point where their endless growing reemphasize the requirement of an even more efficient use of the available bandwidth as seen in the embodiments of the invention.

Figure 2:
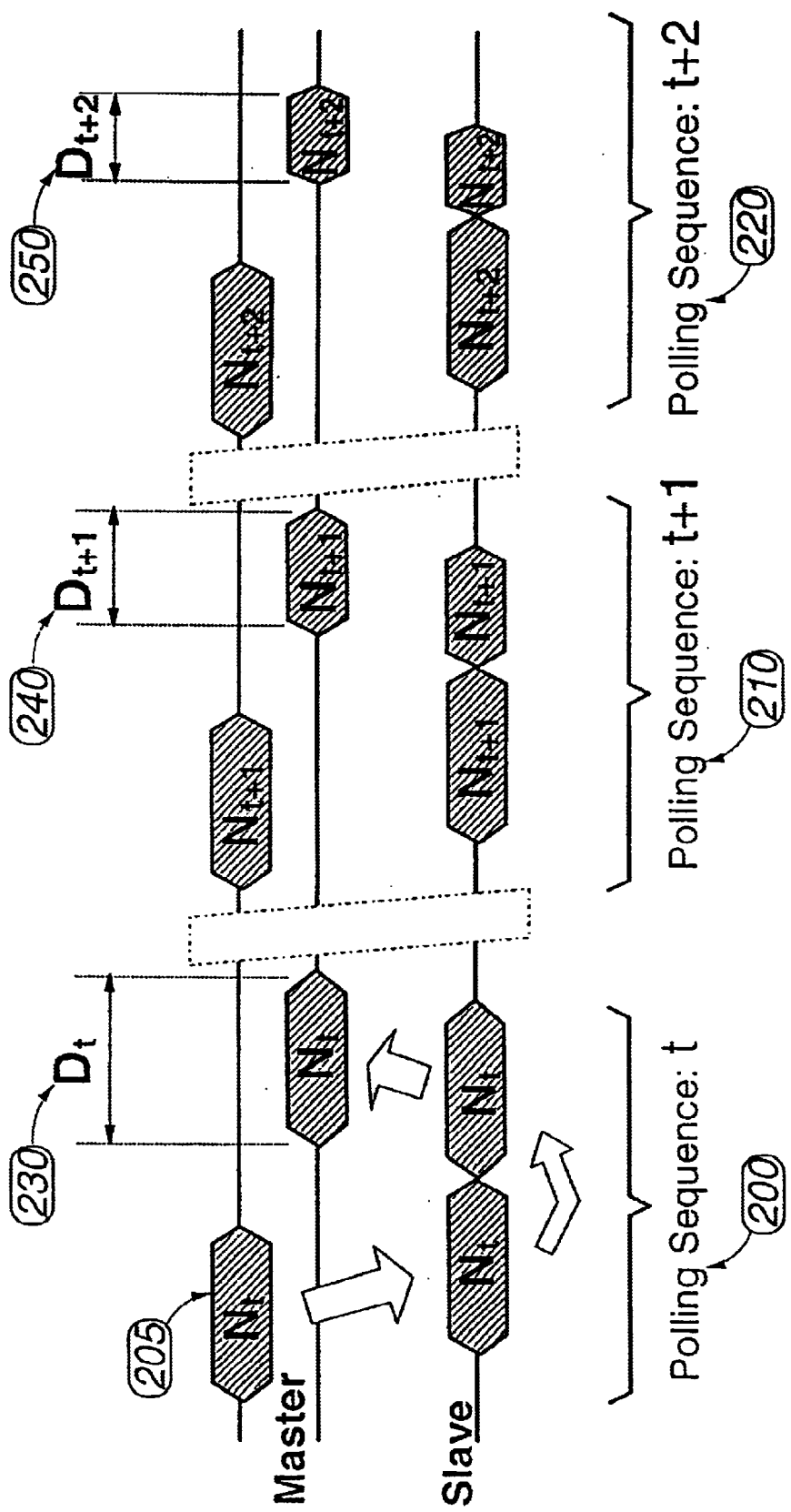
FIG. 2 illustrates the polling method of the invention where the responses from the remote stations become shorter, in favor of longer commands, so as to improve the overall reliability of the duplex communication channel.

FIG. 2 illustrates the polling method of the preferred embodiment in which the polling command [205], destined to a remote station N, during a polling sequence t [200], is conveying, back to the remote terminal, what the master currently understand of the remote station status as a result of the previous exchanges that have taken place before sequence t. Then, it is of the remote terminal responsibility to perform a checking of the command content versus what it has in its own recording and, more generally, versus its current status, so as to formulate a response that is reflecting only the differences between what it has just received and what it knows of its actual state in order to inform the polling station of the changes rather than just responding to a standard polling command. Thus, this mechanism is in itself self-checking. Moreover, it permits improved sharing of the burden of the error recovery processing between the single polling station and each of its remote terminal, now due to perform their own part of the job while previous art was mainly relying on the sole polling station to accomplish it.

Although this scheme assumes that the polling sequence commands are longer, they are always broadcast from the polling unit, or a relay of a master unit, aimed at better covering a particular area (e.g., a cell in the jargon of the mobile or "cellular" wireless phone system) thus, using a more reliable channel less prone to errors that is, less susceptible to require a retransmission, very detrimental to an efficient use of the bandwidth, because the command would be lost or so altered that it becomes unusable. Similarly, with the constant progress of the technology the receiver part of the remote units can be improved without any limit therefore, contributing to make the broadcasting channel safer and more reliable. On contrary, there are physiologic limits to make the transmitter part of the same remote unit, generally in the context of the invention a portable or mobile device operated by a human being in close proximity, more powerful in an attempt to improve the inbound communication channel. Then, since only the differences are conveyed back to the polling station, except during the transition periods that require a lot of updating of the master unit by the remote station, the successive responses tend to become shorter as illustrated in this figure where polling sequences [200], [210] and [220] of remote terminal N trigger responses [230], [240] and [250] that have shorter duration from one polling cycle to the next thus, are less occupying the common transmission medium while being shorter have statistically less chance to be affected by a transmission error.

Figure 6:
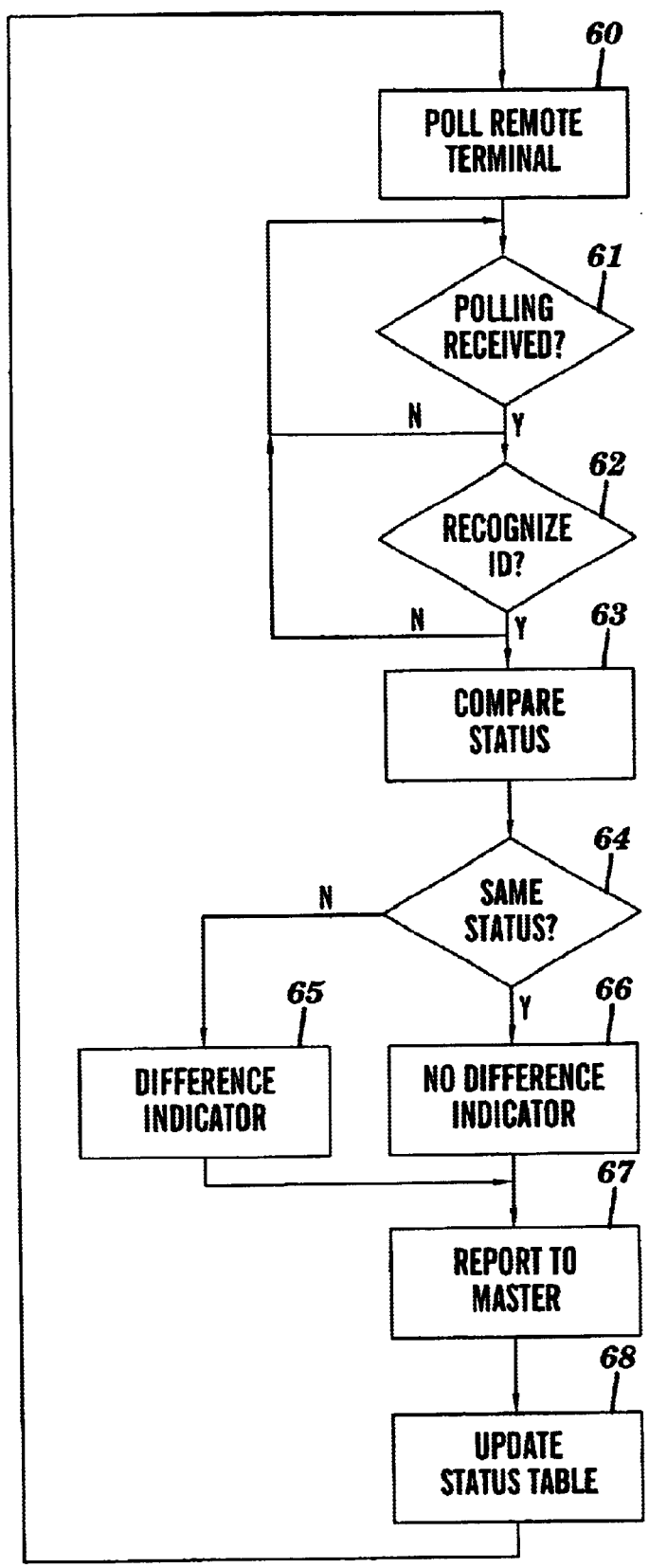
FIG. 6 is a flow chart describing the polling based exchanges in the system formed by the master station and the remote terminals.

In FIG. 6, the flow chart illustrates the polling method of the system comprising a master station and the mobile terminals. A master station broadcasts (60) toward the remote terminals the polling messages, each of them being identified by a remote terminal identification. A remote terminal ready to receive waits (answer no to test 61) until a polling message is received (answer yes to test 61). The remote terminal analyzes the identification which is part of the polling message and ignores it if it is not its own identification (answer no to test 62). If the remote terminal recognizes its identification (answer yes to test 62), it compares in the message the status sent in the polling message with its own status. If the status in the message is identical to the status read in the polling message (answer yes to test 64), the remote terminal prepares an answer indicating that there is no change in the status. In a preferred embodiment this answer is a bit set to 1. If the status read in the polling message is different (answer no to test 64), the remote terminal prepares an answer including an indication that the status has changed (preferably, one bit set to 0), followed by the content of the change if necessary. The remote terminal sends the answer back to the remote station in a response message which should reach the master station in the polling sequence time during a polling sequence duration t, t+n or t+n+1 of FIG. 3). The master station updates (67) its status table by updating the status information with the status information transmitted by the polled remote terminal at the table address corresponding to the remote terminal. The master station restarts a polling sequence by re-broadcasting a new polling message (60).

It is noted that the steps from 61 to 67 are repetitively executed in the remote terminals. In the master station, the polling step 60 is repeated each polling sequence time interval. Each time the polling step 60 is performed, the master station is ready to receive, during the polling sequence time interval, an answer from the polled remote terminal. As soon as the answer is received by the master station, the updating step (68) is executed.

Figure 3:
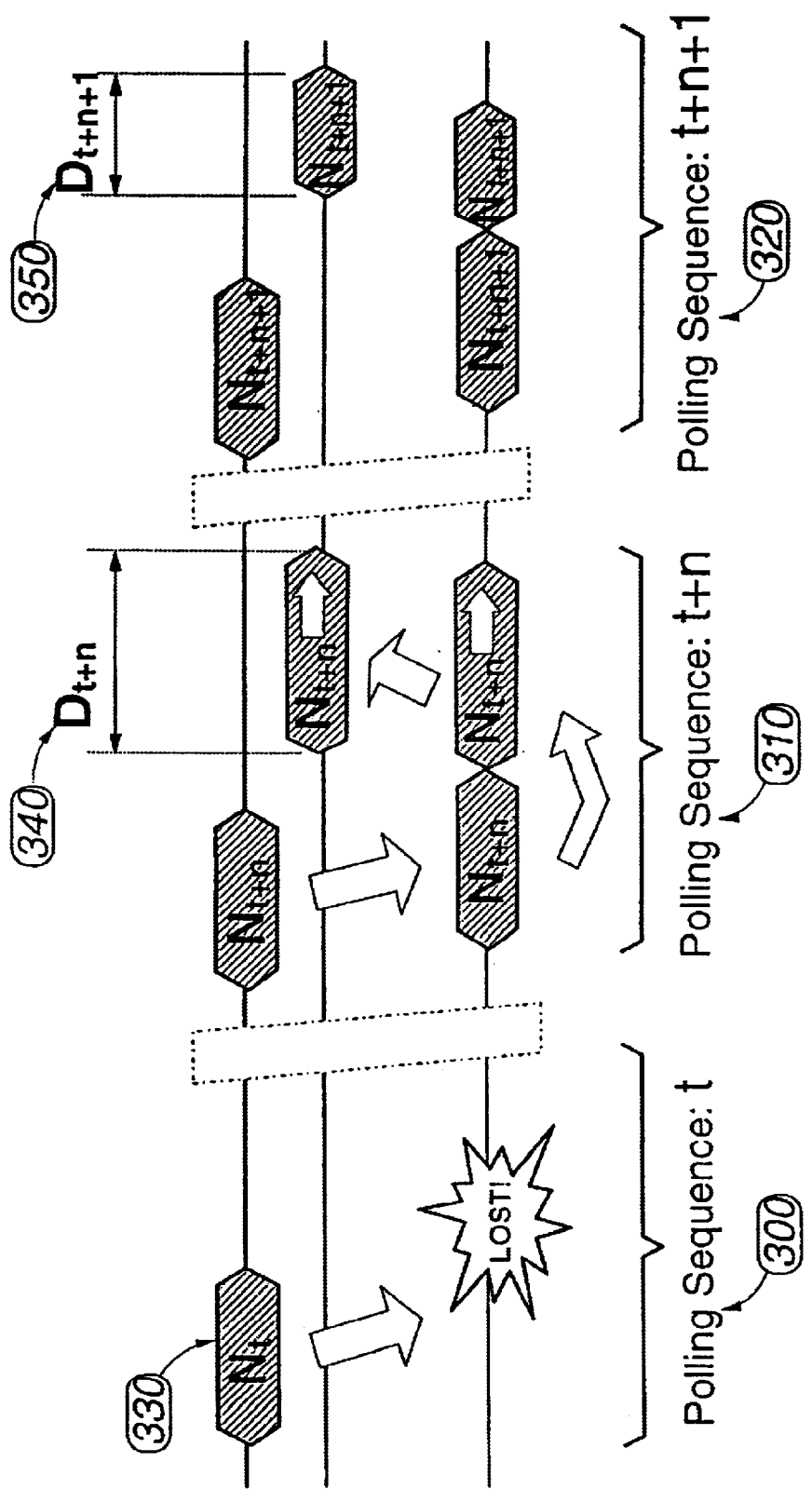
FIG. 3 illustrates the case where a polling command is either not received by a remote station or the response from the remote terminal does not reach the polling unit and how this situation is recovered.

FIG. 3 is a variation of FIG. 2 illustrating the case where a command [330] would either not reach remote unit N or, this is more likely to happen because the inbound are less reliable, a response generated by a remote unit does not reach the master during one [300] or several consecutive polling cycles. Whenever the transmission conditions are restored, in a subsequent polling cycle [310] then, the process described in previous figure just take place without any modification. The only consequence is that the response [340] and, possibly, a few subsequent ones like [350], are likely to be longer than it would have been if some polling sequences had not been disturbed because more update will have to be forwarded to the master. However, obviously, if the remote unit was just idle, then, the changes would hardly be noticeable. Therefore, with the mechanism of the invention, each remote terminal is always able to keep track of what polling station has understood and may repeat automatically the missing information without placing any extra burden on the polling station itself which is busy managing a sometimes huge fleet of terminals.

Figure 4:
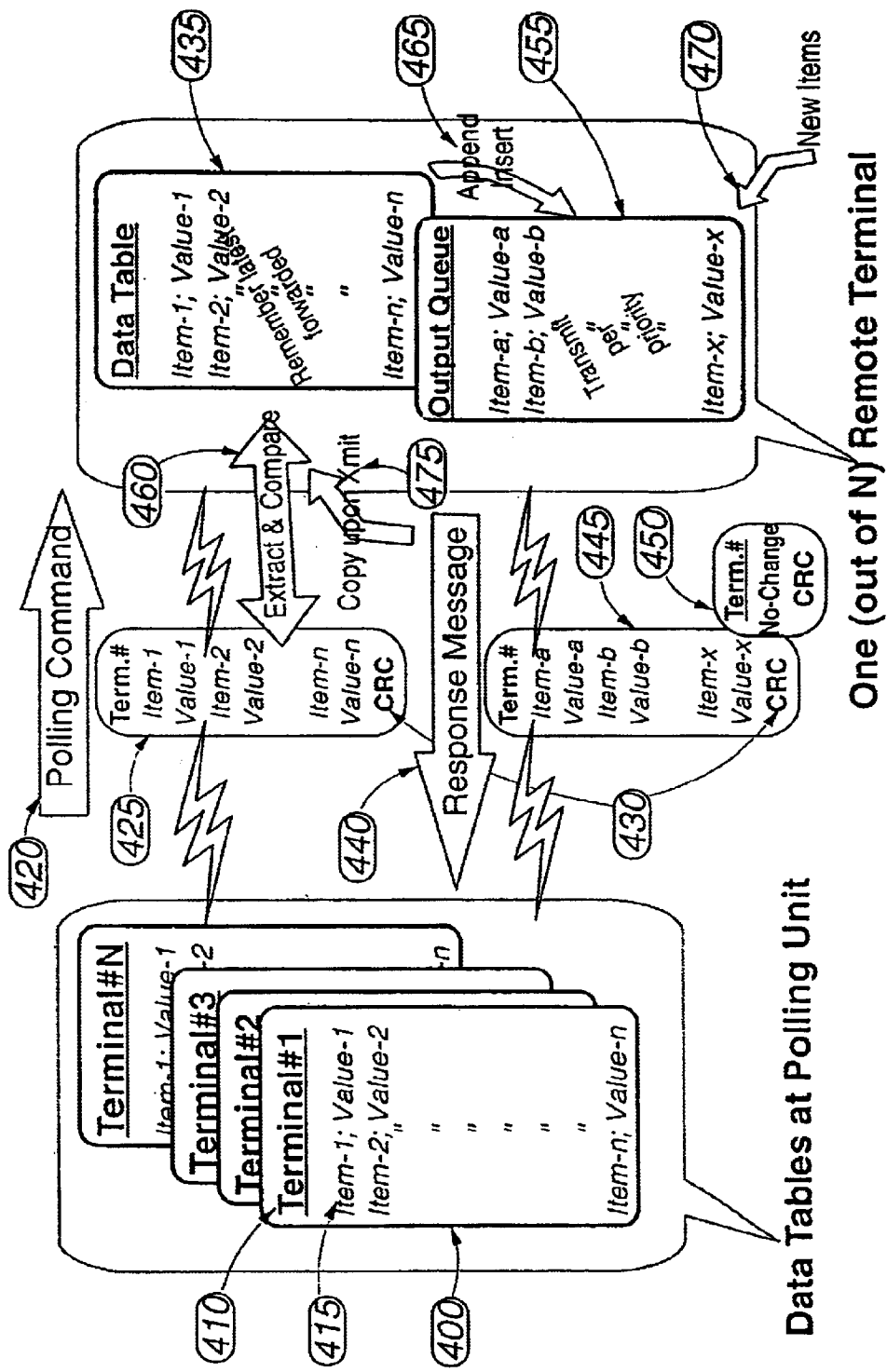
FIG. 4 shows in more details how the information, to be exchanged for managing the duplex communications, must be organized so as to implement the polling method of the invention.

FIG. 4 describes in more details how master and remote must be organized so as the invention can be carried out. The master must keep track of all the slave stations and maintain one data table per remote station it controls. These are tables [400], each corresponding to a particular remote terminal, with a unique identifier [410]. Each table contains enough information to allow controlling all the parameters of the transmission between the remote terminal and the polling unit.

This is shown here under the generic form of a list of items [415] each having an associated value reflecting its current value. A simple example of this would be to consider that, in a particular implementation, a parameter named 'IDLE', that could take the value of '1' or '0', would reflect the status of the remote terminal at any given instant. Thus, for example, the value '1' would be indicative of the fact that the corresponding remote terminal is indeed quiet and has no need to transmit nor is requesting anything. Then, as described in the previous figures, the polling commands [420] are broadcast to the remote terminals, along with a unique identifier, the content of the tables [400] or part of it. It should be obvious to the ones skilled in the art that not all the information contained within each table needs always to be transmitted because this would go against the main purpose of the invention and would needlessly contribute to occupy the shared transmission medium and would dramatically reduce the available bandwidth. In a given context, of which both parties are aware, not all the parameters are needed to be transmitted. If, to go on with the above example of a terminal being idle, it is obviously not necessary to transmit anything but the fact that the polling station has understood that the terminal is indeed idle. Transmitting all the other parameters would be irrelevant in this context although a specific protocol could require that some specific parameters be occasionally transmitted to keep track of the remote terminal (such as the fact that, although idle, a mobile cellular phone is entering a new 'cell'). This is however no longer true as soon as, for example, either one of both parties want to establish a transaction and must start to exchange more information on their respective status and intent thus, moving into another context that may require a different set of parameters to be checked therefore, included into the polling command, per the description of the previous figures. Thus, polling command content will be generally of the form shown at [425]. It may include some form of error correction and/or detection mechanism so as to allow one of the methods of handling transmission errors, previously described, to be effectively carried out. A common practice consists in computing a CRC [430] over what is transmitted and adding a check field that the remote terminal needs to compare with it own computation of what has been received so as to check the integrity of the message. Upon receiving of a polling command the terminal is due to compare it with its own data table [435] which is organized as the corresponding one within the polling unit (although actual implementation can be completely different in the terminal) and was described above. Only the items included into the polling command may be checked and will trigger a response [440]. This response will only contain those of the items, part of the polling command, whose value is different of what polling unit knows and of which terminal is made aware because the item-value was included into the polling command along with the item-number. Then, response content is generally of the form shown in [445] with a list of items that have changed and their current value along, like with the polling command some means for correcting or checking the response as, for instance but not limited to, the CRC technique [430] previously mentioned. However, on contrary of the polling command that must include as least one item (such as the 'IDLE' case previously described) and its corresponding value the response must specifically foreseen a 'NO-CHANGE' response [450] if none of the parameters transmitted into the polling command were found different and if the terminal is not willing to change its context, e.g., starting a communication phase, while it was idle. To be able to generate the above response the terminal needs to maintain an output queue [455] which serves two purposes. A first one is to permit assembling the response after the comparison [460] between the content of the polling command with the corresponding items of the terminal data table [435] has been carried out so that only the items that have a different value are appended or inserted [465] for being sent to the polling station. A second use of the output queue is to prioritize the items so that the most important ones, i.e., the ones that affect the most the overall system operation, are reported first. Also new items [470] may have to be incorporated into the response whenever the terminal is triggering itself a change like when it is initializing a call. As soon as a complete response has been assembled it is sent over to the polling unit and terminal data table [435] is updated with the latest values thus, reflecting the current status of the terminal.

Figure 5:
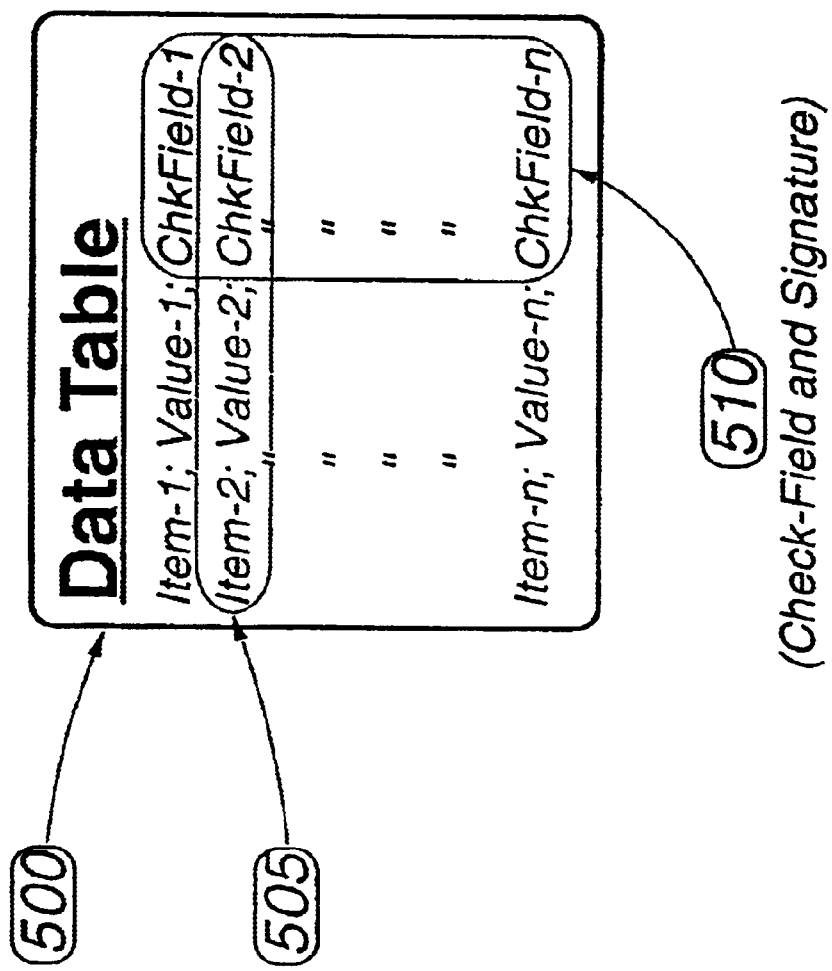
FIG. 5 describes an alternate method for organizing the data tables so as to shorten the exchanges of information and use more efficiently the bandwidth.

FIG. 5 describes one other embodiment for exchanging information between the polling station and the remote terminals so as to shorten the polling commands thus, using even more efficiently the available bandwidth. In which case the data tables previously described in FIG. 4, that is [400] and [435] are conceptually organized as depicted in [500]. Each entry is then a triplet of the form "Item-n; Value-n; ChkField-n". In this approach, instead of having only a single checksum, for example a CRC, to protect a complete polling command or a response, each item is protected with its own check-field [510] possibly remembered into the tables, this latter point being further discussed hereafter since it may not be necessary to remember actually all members of a triplet. Whatever method is actually employed for computing the check-field (there are numerous methods well known from the art) it should be such that the result may also be considered as a signature for the item in question. Then, instead of transmitting into the polling command the item values it becomes feasible to transmit only the check fields that is, the signatures, which is enough to characterize each item. Because the remote terminal has no need to know the item value, it has just to detect from the signature if the polling station has indeed acquired the right value from the latest transmitted response. Obviously, this is efficient only for the items involving large item-values such as statistics or reports, i.e., each time signature may be made significantly shorter than the information it protects. A counter example being the case already mentioned of an "IDLE" item that would only have two values, ON or OFF, which requires only one bit of information. Therefore, using efficiently the bandwidth generally requires the combination of both methods namely the short item values being transmitted as is while longer item values are replaced by their signatures. Although the storing of triplets is potentially requiring more memory it must pointed out that nor the global check field [430] of a polling command or the one of a response (e.g. a CRC) and neither the signature of an item or the item-value itself, whichever is actually NOT used, need to be stored after checking by the receiving device. In other words, the polling station needs only to keep into its data tables the pairs "item-number; item-values" while signatures and/or global check fields are computed on-the-fly when a polling command is forwarded. On contrary, the data table within a remote terminal may contain only the pair "item-number; item-signature" whenever this method permits to shorten the command thus, contributing to free up more bandwidth which is the key factor to be eventually considered.

A cellular wireless network suitable for operating the method of preferred embodiment is described in the US Pat. No. 5,274,841 to Natarajan et al., hereby incorporated by reference, which aims at realizing an efficient allocation of uplink bandwidth with a different polling based bi-directional protocol.

FIG. 7A and FIG. 7B are illustrating the logical control blocks of respectively an implementation of a master station (12) and a remote terminal (10) having a wireless communication employing an IR medium or radio frequency and microwave mediums. With IR communications, the wireless communication channels are carried via an infrared datalink. Presently available optical devices readily provide for operation within the range of approximately 750 nanometers to approximately 1000 nanometers. Within each cell 2 of the IR wireless system of the invention the uplink communications are carried by a first wavelength while the downlink communications are conveyed by a second wavelength that differs from the first wavelength.

Referring to FIG. 7A there is shown a simplified block diagram of the master station 12. The header station 12 is coupled to the LAN I via a connector 14. Connector 14 is coupled to a network adapter transceiver 22 which in turn is coupled to an internal bus 24. The master station 12 includes a processor 26 that is bi-directionally coupled to a memory 28 that stores program-related and other data, including packets of data transmitted to or received from the remote terminals 10. Processor 26 also communicates with IR modulators and receivers; specifically a modulator 30a and a receiver 30b. The IR modulator and receiver have inputs coupled to suitable infrared emitting or receiving devices such as laser diodes, LEDs and photodetectors. In the illustrated embodiment the modulator 30a has an output coupled to a transmit diode (TD) and the receiver 30b has an input coupled to a receive photodiode (RD).

Referring now to FIG. 7B there is shown in block diagram form an embodiment of the mobile unit 10. Mobile unit 10 includes a processor 32 coupled to an operator input device 34 and also coupled to an operator display device 36. Operator input device 34 may be a keyboard or any suitable data entry means. Similarly, operator display device 36 may be a flat panel alphanumeric display or any suitable display means. Also coupled to processor 32 is a memory 38 that stores program-related data and other data, such as packets of information received from or intended to be transmitted to the master station 12 and also an identification of the remote terminal 10. Also coupled to processor 32 are a modulator 40a and a receiver 40b. The data receivers of FIGS. 7A and 7B include demodulators and filters and operate in a conventional manner to extract the modulated bit stream from the received optical signals. Similarly, the modulators of FIGS. 7A and 7B operate in a conventional manner to modulate the optical output in accordance with a transmitted bit stream. A preferred data transmission rate is in the range of approximately one to ten million bits per second (1–10 Mbits/sec), although any suitable data transmission rate may be employed.

In the wireless communication system of the invention all wireless communication is between the master station 12 and the remote terminals 10, direct communications between the remote terminals 10 are not considered here.

Although described in the context of a wireless network employing an IR medium it should be realized that the method of the invention may also be practiced with other types of wireless networks that employ, by example radio frequency (RF) and microwave mediums. For a selected wireless medium one consideration is the propagation delay of the wireless signals. The propagation delay is primarily a function of the size of the communication cell. For an IR wireless link cell sizes are relatively small (tens of feet) and the propagation delay is negligible. For RF embodiments cell sizes are much larger (in the range of hundreds to thousands of feet) with correspondingly larger propagation delays.

In a preferred embodiment of the invention, the polling method as described in the flow chart involving both the master station and the remote terminals, is implemented as a software application operating in the processors of the master station and of the remote terminals. The memory units are used for program and data storing. These units are accessed by the applications during their execution in the processor. The status tables maintained both in the master station and the mobile terminals are stored in these memory units.

It is noted that FIG. 7A and FIG. 7B show a specific embodiment of the invention in the master station and in the remote terminal based on a processor and storage unit. However, some or all the steps of the method can be implemented by using hardware assist logics and dedicated processing as well known by the person skilled in the art. Consequently, while the invention has been particularly shown and described with respects to preferred embodiments hereof, it will be understood by those skilled in the art that changes in form and details may be made herein without departing from the scope and the spirit of the invention.

What is claimed is:

1. In a duplex communications system comprising a master station which controls access by a multiplicity of remote terminals to a broadcasting channel, said channel being for transmitting and receiving signals to and from said controlled remote terminals, a method of polling from said master station all said remote terminals, comprising the steps of:

broadcasting from a master station a polling command destined to a particular remote terminal, the polling command including a unique identifier and a status of the particular remote terminal which is stored in the master station;

receiving in all the remote terminals the polling command which is decoded so that only one of the remote terminals, recognizing its identifier, performs a self selection;

comparing, in the self selecting remote terminal, the status read in the polling command versus the actual current status of the self selecting remote terminal;

if no difference is observed between the current status of the terminal and the status in the polling command, forwarding to the master station, from the self selecting remote terminal, a response to the polling command including a report that no difference is observed between the current status of the terminal and said status of said polling command;

if a difference is observed between the current status of the terminal and the status in the polling command, forwarding to the master station, from the self selecting remote terminal, a response to the polling command including a report of the differences observed between the current status of the terminal and the status of the polling command; and, updating in the master station the stored status of the answering terminal with the status corresponding to the reporting received in the response from the terminal.

2. The method of claim 1 further comprising the steps of continuously repeating the steps of claim 1 for all the remote terminals controlled by the master station while it is up and operating.

3. The method of claim 2 wherein each broadcasting step includes a step of selecting, as the status in the polling command, a subset of a whole status of the remote terminal stored in the master station, the subset being self-sufficient to control the particular remote terminal, said method further comprising the step of adapting selecting of subset according to the context.

4. The method of claim 1 wherein the step of response forwarding, if a difference is observed between the current status of the terminal and the status in the polling command, comprises the step of including in the response to the polling command sent from the terminal, any outstanding remote terminal generated change which affects the status.

5. In a duplex communications system comprising a master station which controls access by a multiplicity of remote terminals to a broadcasting channel, said channel being for transmitting and receiving signals to and from said controlled remote terminals, a method of polling from said master station all said remote terminals, comprising the steps of:

broadcasting from a master station a polling command destined to a particular remote terminal, the polling command including a unique identifier and a status of the particular remote terminal which is stored in the master station;

receiving in all the remote terminals the polling command which is decoded so that only one of the remote terminals, recognizing its identifier, performs a self selection;

comparing, in the self selecting remote terminal, the status read in the polling command versus the actual current status of the self selecting remote terminal;

if no difference is observed between the current status of the terminal and the status in the polling command, forwarding to the master station, from the self selecting remote terminal, a response to the polling command including a report that no difference is observed between the current status of the terminal and said the status of said polling command;

if a difference is observed between the current status of the terminal and the status in the polling command, forwarding to the master station, from the self selecting remote terminal, a response to the polling command including a report of the differences observed between the current status of the terminal and the status of the polling command; and, updating in the master station the stored status of the answering terminal with the status corresponding to the reporting received in the response from the terminal, wherein the steps of broadcasting the status and forwarding a response comprise the step of preparing respectively as the status and the response, a list of variables and associated variable values respectively stored in the master station and in the remote terminal.

6. The method of claim 5 wherein the steps of preparing the status and the response further comprises a step of adding a global check field.

7. The method of claim 5 wherein the step of preparing the status and the response further comprises a step of adding to each variable and variable value a variable attached checkfield also respectively stored in the master station and in the remote terminal, the variable attached checkfields being used as signatures of the variables.

8. The method of claim 1 wherein the steps of broadcasting the status and forwarding a response comprise the step of respectively preparing as the status and the response, a list of variables and associated variable attached checkfields respectively stored in the master station and in the remote terminal along with the variable values which are not transmitted and only stored in the remote terminal, the variable attached checkfields being used as signatures of the variables.

9. The method of claim 8 wherein the step of preparing the response first comprises a step of applying a priority order in the list of variables and their associated checkfields.

10. The method of claim 5 wherein the step of preparing the response first comprises a step of applying a priority order in the list of variables and their associated values.

11. A wireless terminal connected to a wireless network comprising:
   a receiver for receiving downlink information from the master station;
   a storage unit storing the current status of the terminal;
   a processor analyzing a polling command received from a master station including one wireless terminal identification and its corresponding status and, if recognizing its terminal identification, comparing the status read in the polling command with the current status read in its storage;
   a transmitter for transmitting uplink information to the master station in the form of a response to the polling command and including a reporting that no difference is observed between the current status of the terminal and said status of said polling command if it is the case or a reporting of the differences which are observed between the current status of the terminal and said status of said polling command.

12. A duplex communications system for communicating over a wireless network, said system comprising:
   at least one master station including:
      a transmitter for transmitting downlink information to the wireless network;
      a storage unit, storing a table comprising wireless terminal identification and its status;
      a processor computing a polling command which is then broadcasted on the wireless network and including one wireless terminal identification and its corresponding status;
      a receiver receiving uplink information from the wireless network and particularly responses from the polled wireless terminals which are then processed by the processor and used to update the status of that polled terminals in the storage unit;
   at least one wireless terminal including
      a receiver for receiving downlink information from the master station;
      a storage unit storing the current status of the terminal;
      a processor analyzing the polling command received from the master station and, if recognizing its terminal identification, comparing the status read in the polling command with the current status read in its storage unit;
      a transmitter for transmitting uplink information to the master station in the form of a response to the polling command and including a reporting that no difference is observed between the current status of the terminal and said status of said polling command if it is the case or a reporting of the differences which are observed between the current status of the terminal and said status of said polling command.

* * * * *